United States Patent

Kanda et al.

[11] 4,313,138
[45] Jan. 26, 1982

[54] IMAGE INFORMATION READING SYSTEM OF FACSIMILE APPARATUS

[75] Inventors: Hajime Kanda, Ayase; Takesada Hirose, Tokyo, both of Japan

[73] Assignee: Ricoh Company Ltd., Tokyo, Japan

[21] Appl. No.: 131,277

[22] Filed: Mar. 17, 1980

[30] Foreign Application Priority Data

Mar. 17, 1979 [JP] Japan .................................. 54-30547

[51] Int. Cl.³ .............................................. H04H 1/40
[52] U.S. Cl. ..................................... 358/280; 358/288; 358/293
[58] Field of Search ............... 358/293, 285, 199, 206, 358/288, 280

[56] References Cited

U.S. PATENT DOCUMENTS 3,499,975 3/1970 Arps ..................................... 358/288

Primary Examiner—Jin F. Ng
Assistant Examiner—Edward L. Coles
Attorney, Agent, or Firm—Oblon, Fisher, Spivak, McClelland & Maier

[57] ABSTRACT

An image information reading system capable of reading image information of original to be read in each main scanning line a plurality of times within the reading time available for one line thereof in the main scanning direction, storing the read image information in a plurality of memory means, and subjecting all the stored image information for one main scanning line to a predetermined logic processing in synchronization with the final reading of each scanning line read, whereby the image information of each main scanning line is determined.

6 Claims, 5 Drawing Figures

| DI₁ | DI₂ | DI₃ | DI₄ | DIO |
|---|---|---|---|---|
| 0 | 0 | 0 | 0 | 0 |
| 1 | 0 | 0 | 0 | 0 |
| 0 | 1 | 0 | 0 | 0 |
| 1 | 1 | 0 | 0 | 1 |
| 0 | 0 | 1 | 0 | 0 |
| 1 | 0 | 1 | 0 | 1 |
| 0 | 1 | 1 | 0 | 1 |
| 1 | 1 | 1 | 0 | 1 |
| 0 | 0 | 0 | 1 | 0 |
| 1 | 0 | 0 | 1 | 1 |
| 0 | 1 | 0 | 1 | 1 |
| 1 | 1 | 0 | 1 | 1 |
| 0 | 0 | 1 | 1 | 1 |
| 1 | 0 | 1 | 1 | 1 |
| 0 | 1 | 1 | 1 | 1 |
| 1 | 1 | 1 | 1 | 1 |

IMAGE INFORMATION READING SYSTEM OF FACSIMILE APPARATUS

BACKGROUND OF THE INVENTION

The present invention relates to an image information reading system for reading and reproducing image information in facsimile apparatus.

In the conventional image information reading system employing a solid scanning element for scanning one line, two types of systems are known in the art, that is, a system in which the subscanning is performed each time the main scanning of one line has been completed, and a system in which the main scanning and the subscanning are performed simultaneously.

In the former system, it could happen that information which may exist between one main scanning line and the next main scanning line is missed, and thin lines in the main scanning direction of the picture to be transmistted are not reproduced. Therefore, recently ony the latter system is in general use.

In the image information reading system in which the main scanning and the subscanning are performed simultaneously, images cannot be reproduced well if the scanning time for one main scanning line is set too long.

This is because there is a relationship between a charge storage time $\tau_D$ and a dark signal $S_D$ in the solid scanning element as shown in FIG. 1. When the scanning time is set too long, the dark signal $S_D$ is increased and, at the same time, the dark signal $S_D$ is stored in the solid scanning element, together with the image signal, making the S/N ratio inferior. It follows that erroneous information tends to be contained in the image information output from the solid scanning element.

Conventionally, in order to improve the S/N ratio by shortening the charge integration time $\tau_S$, the scanning time is increased by N times and, as shown in FIG. 2 (a), the image information for one line is obtained by scanning in 1/N of the time $\tau$ required for reading one line (the time available for the main scanning). In another conventional methods, as shown in FIG. 2 (b), the read scanning is performed N times within the time $\tau$ available for reading one line, and the image information for one line is obtained from the scanning out of the N scannings.

As a result, the S/N ratio is improved, but the main scanning is performed only for 1/N of the reading time $\tau$ for one line, while the subscanning is performed continuously during the reading time $\tau$, so that the resolution in the subscanning direction is reduced, and thin lines in the main scanning direction may be omitted. This makes it difficult to obtain good images in the conventional image information reading system.

SUMMARY OF THE INVENTION

It is therefore an object of the present invention to provide an image information reading system capable of obtaining image information with an improved S/N ratio, in which the resolution in the main scanning direction and the subscanning direction are improved and the previously mentioned shortcomings of the conventional image information reading systems are eliminated.

In order to attain this object, in the present invention, the main scanning is performed a plurality of times within the reading time for one line and each of the thus obtained image information readings is subjected to predetermined logical processing, whereby the image information to be read or transmitted is determined.

According to the present invention, since the main scanning is performed a plurality of times within the reading time for one line, the charge integration time of the solid scanning element can be shortened and accordingly the S/N ratio can be improved. Furthermore, each image information reading obtained is subjected to a predetermined logic processing so that image information for one line is determined. Therefore, the resolution of the image in the subscanning direction is improved and thin lines in the main scanning direction of the picture to be transmitted can be reliably reproduced without causing any flying spots.

DETAILED DESCRIPTION OF THE PREFERRED EMBODIMENTS

Figure 1:
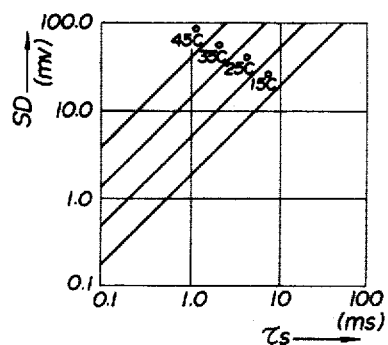
FIG. 1 is a characteristic diagram showing the relationship between the charge integration time and the dark signal of a solid scanning element.
Figure 2:
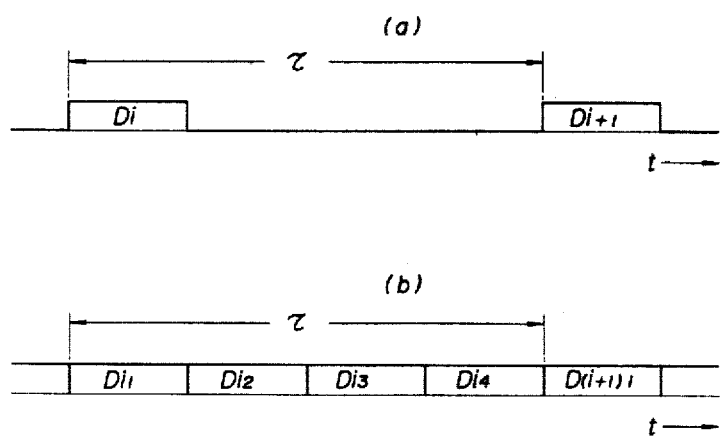
FIG. 2 is a time chart for explaining a conventional image information reading operation.
Figure 3:
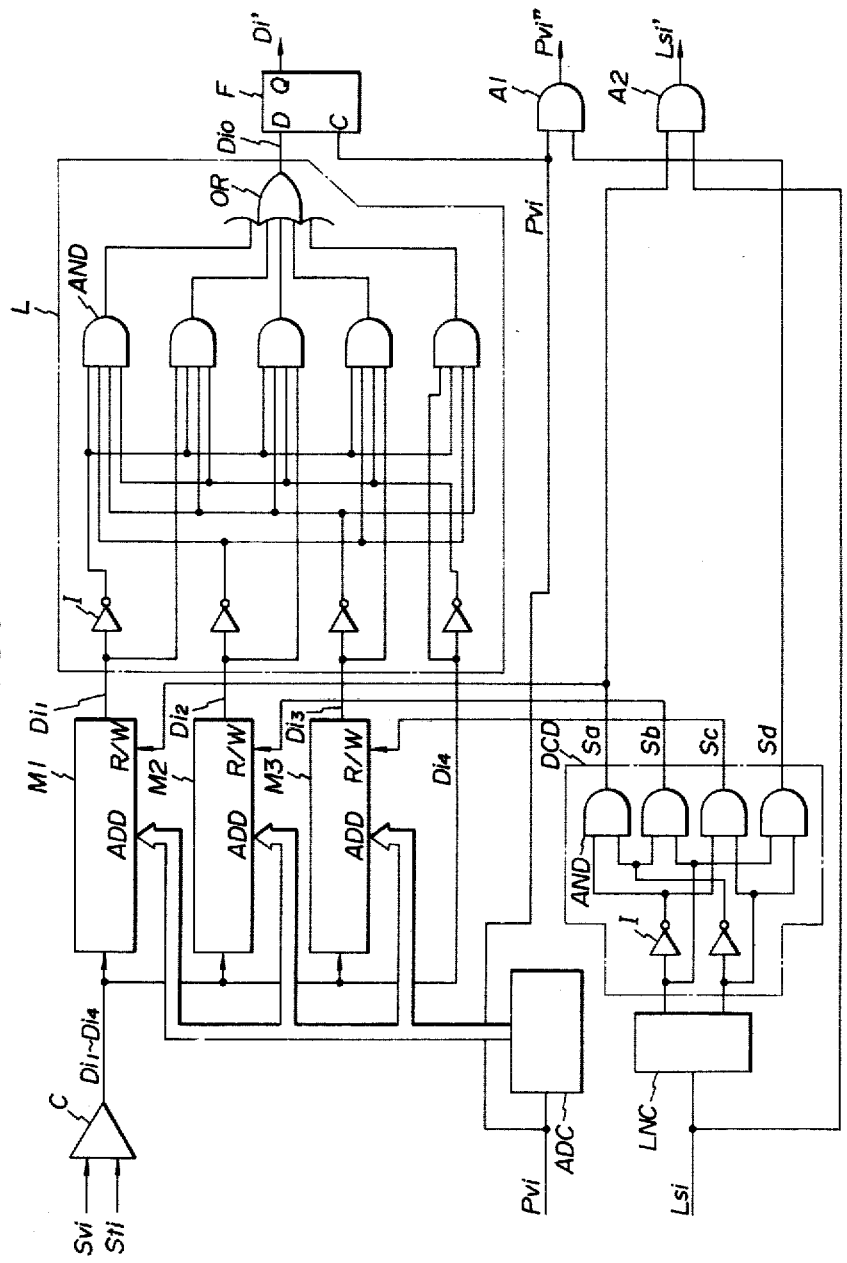
FIG. 3 is a circuit diagram of an image information processing portion of an embodiment of an image information reading system according to the present invention.

Referring to FIG. 3, there is shown a circuit diagram of an image information processing portion which is applicable to an embodiment of an image information reading system according to the present invention. The image information processing portion comprises a comparator C which compares an analog video signal output $S_{vi}$ from a solid scanning element (not shown) with a threshold level signal $S_{tl}$ and converts the result into a binary signal; memories M1~M3, each having a storage capacity of one line; an address counter ADC for counting the video clock $P_{vi}$ in order to apply an address ADD to the memories M1~M3; a majority logic circuit L for determining a majority logic for outputs $D_{i1}$~$D_{i3}$ of the memories M1~M3 and an output $D_{i4}$ of the comparator C; a flip-flop F for latching the output of the majority logic circuit L by the video clock $P_{vi}$; a line counter LNC for counting a line synchronization signal $L_{si}$ which is generated at each main scanning line; a decoder DCD for decoding the output of the line counter LNC; an AND gate A1 for outputting a video clock $P_{vi}$, in synchronization with the image information for one line, which is output from the flip-flop F; and an AND gate A2 for outputting a line synchronization signal $L_{vi}$.

Figures 4, 5:
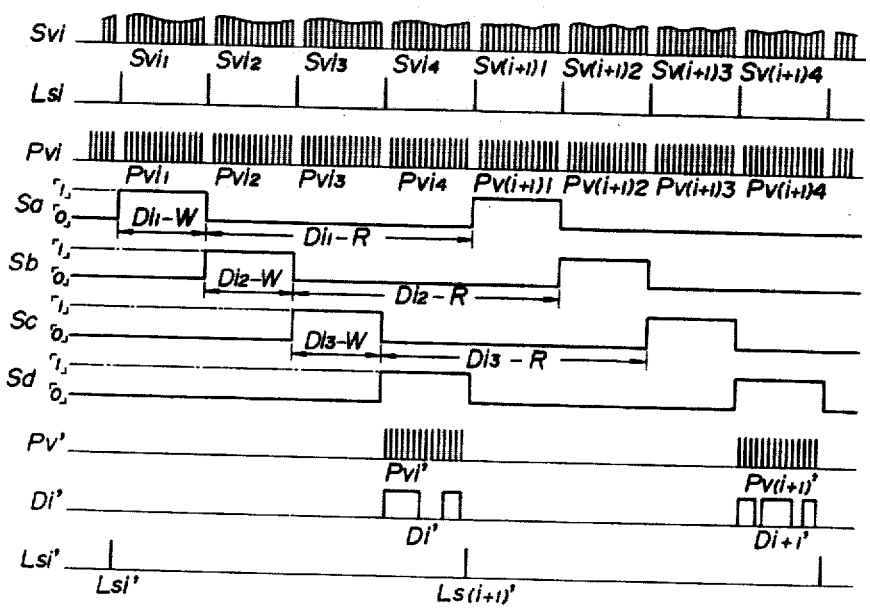
FIG. 4 is a table showing the relationship between input and output data in a logic circuit of the image information processing portion of FIG. 3.
FIG. 5 is a time chart for explaining the operation of the image information processing portion of FIG. 3.

In the majority logic circuit L, four inversion circuits I, five AND gates AND and an OR gate OR are connected to each other as shown in FIG. 3, and the majority logic circuit L is constructed so as to output a logic $D_{i0}$ in accordance with logic Signals $D_{i1}$~$D_{i4}$ applied thereto as shown in FIG. 4. In FIG. 4, "0" indicates a white signal and "1" indicates a black signal.

In the decoder DCD, the inversion circuits I and the AND gates AND are connected to each other as shown in FIG. 3 and the decoder DCD is constructed so as to produce signals $S_a \sim S_c$ for switching the operation of the memories $M1 \sim M3$ to the writing mode W or to the reading mode R whenever the line synchronization signal $L_{si}$ is input thereto, and also to produce a signal $S_d$ for taking out the video clock $P_{vi}'$.

In the thus constructed embodiment of the image information reading system according to the present invention, it is supposed that the main scanning is performed four times at a scanning speed of, for example, 5 ms, within a reading time available for one line, for example, 20 ms in the case of a 4800 bps modem, which is determined by the transmission speed of the data transmitted from the modem to the comparator C. When the analog video signals $S_{vi1} \sim S_{vi4}$ for four scans at the ith line are successively input to the image information system from the solid scanning element in synchronization with the video clock $P_{vi}$ having a frequency four times as great as the transmission speed, referring to the time chart of FIG. 5, the operation of obtaining data $D_i'$ for the ith line, from binary data $D_{i1} \sim D_{i4}$ of 4 scans which are output from the comparator C, will now be explained.

In synchronization with the input of the analog video signal $S_{vi}$, the video clock $P_{vi}$ is input to the address counter ADC, while the line synchronization signal $L_{si}$ is input to the line counter LNC.

When the line synchronization signal $L_{si}$ is input to the line counter LNC, the value is counted as [0,0] and the output signal $S_a$ of the decoder DCD is set at logic [1].

When the signal $S_a$ is in the state of [1], a line synchronizaton signal $L_{si}'$, which is necessary for the next processing, is output from the AND gate A2, and the memory M1 is set in the writing mode W, whereby the data $D_{i1}$ for one scan output from the comparator C is successively written one bit after another in the momory M1 in accordance with the address ADD output from the address counter ADC.

When the writing of the data $D_{i1}$ of one scan has been completed, the data $D_{i2}$ for the next scan is output from the comparator C.

By the line synchronization, signal $L_{si}$ input in synchronization with the above-mentioned operation, the counted value of the line counter LNC becomes [0,1]. As a result, the output condition of the decoder CDC is switched so that the signal $S_b$ is set in the state of [1] and the memory M2 is set under the writing mode W.

Therefore, the second data $D_{i2}$ is written in the memory M2 and the third data $D_{i3}$ is written in the memory M3 when the signal $S_c$ is set in the condition of [1].

When the data $D_{i4}$ for the last scan at the ith line is output from the comparator C, the Data $D_{i1} \sim D_{i3}$ are output from the memories $M1 \sim M3$, respectively and input to the logic circuit L one bit after another.

The logic circuit L outputs the logic data $D_{i0}$ shown in FIG. 4 in accordance with each of the data $D_{i1} \sim D_{i4}$ applied thereto.

As can be seen from FIG. 4, the majority logic of each of the data $D_{i1} \sim D_{i4}$ input at the ith line is obtained and if there exist two or more black signal logics [1], data $D_{i0}$, which reliably covers the image information in the subscanning direction of the picture to be transmitted, is output in the form of a black signal [1].

Since the data $D_{i0}$ is input together with the video clock $P_{vi}$ to the flip-flop F, data $D_i'$ for one scan at ith line is output from the flip-flop F.

At this moment, the AND gate A1 is in the state of [1] and is opened by an output $S_d$ of the decoder DCD, and a video clock $P_{vi}'$ is output from the AND gate A1 in synchronization with the data $D_i'$.

A certain data is always output from the flip-flop F. However, in the succeeding circuit, data is processed by the line synchronization signal $L_{si}'$ which is output from the AND gate A2 and the video clock $P_{vi}'$ which is output thereafter from the AND gate A1. Therefore, out of the data which are output from the flip-flop F, by subjecting the data $D_{i1} \sim D_{i4}$ of the above-mentioned four scans to a logic processing, only the data $D_i'$ of one line at the time when the output $S_d$ of the decoder DCD is in the state of [1] is adopted in the next processing circuit (not shown) as normal data.

Therefore, if the data processing, such as a coding process, is performed in the next processing circuit and the processed data is transmitted to a facsimile receiver through a modem, an excellent image record can be obtained by the receiver.

In this embodiment, since the main scanning is performed four times within the time available for reading one line, the charge integration time can be shortened and accordingly the S/N ratio can be improved. Furthermore, since the image information for one line is obtained by taking the majority logic of the data obtained by the four scans, thin lines in the main scaning direction of the picture to be transmitted can be reliably reproduced at the facsimile receiver. Furthermore, dotted smears and dust on the original can be removed at the time of the logic processing. Furthermore, error bits which are caused by noise during the scanning can also be removed at the time of the logic processing. Therefore, a record image can be reproduced at the facsimile receiver without any flying spots.

In the above-mentioned embodiment, the logic circuit L is constructed in such a manner that the output data $D_{i0}$ is placed in the state of [1] when two or more bits are in the state of [1] out of the data $D_{i1} \sim D_{i4}$ for four scans at the ith line, which are input to the logic circuit L. However, it is preferable that the logic construction of the logic circuit L be of Logic "0" when only the data $D_{i1}$ and $D_{i4}$ are in the state of "1" since they have a close correlation with the image information in the preceding (i−1) line and the succeeding (i+1) line.

Furthermore, the logic circuit L can be constructed so as to set its output in the state of "1" when only 3 or more bits out of the data input thereto are in the state of "1".

Furthermore, the logic circuit L can be constructed in a programmable manner, so that a suitable program can be chosen in accordance with the condition of an original image to be transmitted and a selected scanning line density.

The number of the main scannings to be performed within the reading time available for one line and, accordingly, the number of the date to be input to the logic circuit L, which is determined by the selected main scanning, can be set as desired.

What is claimed is:

1. An image information reading system comprising:
    reading means for reading the image information of each information of each line by scanning the image of original a plurality of times within the time available for reading one line in the main scanning direction thereof;
    memory means for successively storing the image information of each line which is output from said reading means;

means for taking out simultaneously the image information of each scan so far stored from said memory means, in synchronization with the last scan of said image information by said reading means within said reading time; and logic processing means for receiving thereto the image information obtained by said last scan and said image information taken out simultaneously from said memory and obtaining image information of said one line out of the image information of each scan obtained by said reading means.

2. An image information reading system as claimed in claim 1, wherein said reading means is a solid scanning element comprising a photoelectric conversion element for one main scanning line.

3. An image information reading system as claimed in claim 1, wherein said logic processing means comprises a majority logic circuit.

4. An image information reading system as claimed in claim 1, wherein said logic processing means comprises a majority logic circuit which is weighted in accordance an input to be applied thereto.

5. An image information reading system as claimed in claim 1, wherein said logic processing means comprises a programmable majority logic circuit.

6. An image information reading system as claimed in claim 1, wherein said reading means constitutes a data transmission section of a facsimile apparatus of the type capable of performing the main scanning and the sub-scanning simultaneously.

* * * * *